United States Patent
Kuschk et al.

(10) Patent No.: US 12,399,273 B2
(45) Date of Patent: Aug. 26, 2025

(54) SETTING RADAR PARAMETERS FOR GENERATING POINT CLOUDS BASED UPON RAW RADAR DATA

(71) Applicant: GM Cruise Holdings LLC, San Francisco, CA (US)

(72) Inventors: Georg Kuschk, Garmisch-Partenkirchen (DE); Marc Unzueta Canals, Munich (DE); Michael Meyer, Munich (DE); Sven Möller, Lübbecke (DE)

(73) Assignee: GM Cruise Holdings LLC, San Francisco, CA (US)

( * ) Notice: Subject to any disclaimer, the term of this patent is extended or adjusted under 35 U.S.C. 154(b) by 370 days.

(21) Appl. No.: 17/899,809

(22) Filed: Aug. 31, 2022

(65) Prior Publication Data

US 2024/0019570 A1    Jan. 18, 2024

(51) Int. Cl.
*G01S 13/931* (2020.01)
*G01S 13/89* (2006.01)

(52) U.S. Cl.
CPC ............ *G01S 13/931* (2013.01); *G01S 13/89* (2013.01)

(58) Field of Classification Search
CPC ........ G01S 13/931; G01S 13/89; G01S 7/417; G01S 13/524; G01S 13/536; G01S 13/582; G01S 13/584; G01S 13/862; G01S 13/865; G01S 13/867; G01S 17/86; G01S 2013/9318; G01S 2013/93185; G01S 2013/9319
See application file for complete search history.

(56) References Cited

U.S. PATENT DOCUMENTS

| | | | |
|---|---|---|---|
| 11,628,855 B1* | 4/2023 | Pradhan | G01S 17/58 701/24 |
| 11,885,907 B2* | 1/2024 | Popov | G06T 7/73 |
| 2020/0334452 A1* | 10/2020 | Gurbuz | G01S 7/354 |
| 2020/0400810 A1* | 12/2020 | Cho | G01S 13/9047 |
| 2022/0196798 A1* | 6/2022 | Chen | G01S 13/89 |

FOREIGN PATENT DOCUMENTS

WO    2022139783 A1    6/2022

OTHER PUBLICATIONS

"Extended European Search Report for European Patent Application No. 22184799.9", Mailed Date: Dec. 21, 2022, 7 pages.

* cited by examiner

*Primary Examiner* — Vladimir Magloire
*Assistant Examiner* — Yonghong Li
(74) *Attorney, Agent, or Firm* — Honigman LLP; Matthew H. Szalach; Jonathan P. O'Brien

(57) ABSTRACT

Technologies described herein relate to learning parameter values of a preprocessing algorithm that is executed in a radar system. The preprocessing algorithm is configured to receive raw radar data as input and is further configured to generate three-dimensional point clouds as output, where the preprocessing algorithm generates the three-dimensional point clouds based upon the raw radar data and the parameter values that are assigned to the preprocessing algorithm. To learn the parameter values, the preprocessing algorithm is converted to auto-differentiated form and is added as an input network layer to a deep neural network (DNN) that is configured to identify objects represented in three-dimensional point clouds. The parameter values are learned jointly with weight matrices of the DNN.

20 Claims, 6 Drawing Sheets

SETTING RADAR PARAMETERS FOR GENERATING POINT CLOUDS BASED UPON RAW RADAR DATA

RELATED APPLICATION

This application claims priority to European Patent Application No. 22184799.9, filed on Jul. 13, 2022, and entitled "SETTING RADAR PARAMETERS FOR GENERATING POINT CLOUDS BASED UPON RAW RADAR DATA". The entirety of this application is incorporated herein by reference.

BACKGROUND

Perception systems are configured to identify surrounding objects based upon sensor signals generated by sensor systems. For example, a system may include a variety of cameras, lidar sensor systems, radar sensor systems, etc., and a perception system can identify surrounding objects based upon outputs of such sensors. With reference specifically to radar sensor systems, the sensor hardware of such systems generally, for predefined time intervals, generates raw data, which may be in the form of data tensors. Such data tensors may be one of several types depending upon the stage of processing, including: 1) tensors that include bins for samples, ramps, and channels (time domain data); 2) tensors that include bins for range, ramps, and channels (range data); 3) tensors that includes bins for range, doppler, and channels (velocity data); and 4) tensors that includes bins for range, doppler, and azimuth (beam data).

Conventionally, radar systems include onboard firmware that is configured to construct point clouds based upon the raw radar data (which may include data tensors of one or more of the types referenced above). The conversion of raw radar data to a point cloud is based upon an algorithm that is parameterized by several parameter values influencing the signal characteristics of the generated point cloud in, for example, their maximum range, velocity disambiguity range, actual attributes of points of the point cloud (e.g., x, y[,z] location, range, velocity, reflected energy intensity, etc.). For instance, a relatively high value for a first parameter may enhance range resolution while decreasing angular resolution. Typically, the parameter values are manually selected by experts in the field and are then hardcoded into the firmware for the radar system and, as indicated above, the resultant point clouds are dependent upon the parameter values. After a radar system is developed and the parameter values are hardcoded into firmware of the radar system, the radar system is deployed in a system (such as an autonomous vehicle (AV), an aircraft, a drone, a watercraft, a security system, etc.), such that the radar system generates n-dimensional point clouds. The point clouds are then labeled to identify objects represented in such point clouds, and subsequently a deep neural network (DNN) is trained based upon the labeled point clouds. Accordingly, the trained DNN, during operation of the system, receives point clouds from the radar system and identifies objects represented in the point clouds, and the system performs some action based upon the identified objects (such as a driving maneuver, generating a notification, an aerial maneuver, etc.). Accuracy of the DNN when identifying objects, however, is dependent upon the parameter values selected by the expert (where the point clouds are generated based upon the parameter values); accordingly, when an expert selects suboptimal parameter values, the resultant (trained) DNN is suboptimal. In addition, the approach described above is time-consuming, as collecting training data through operation of the radar system is time-consuming.

To address at least some of the shortcomings described above, after raw radar data has been collected, clusters of computing devices have been configured to generate several different sets of point clouds based upon the raw radar data, where each set corresponds to a different set of parameters. More specifically, a first set of point clouds is generated from the raw sensor data based upon a pre-processing algorithm that is parameterized with first parameter values, a second set of point clouds is generated from the raw sensor data based upon the pre-processing algorithm parameterized with second parameter values, and so forth. Thereafter, several DNNs are trained based upon respective sets of point clouds; in particular, a first DNN is trained based upon the first set of point clouds, the second DNN is trained based upon the second set of point clouds, and so forth. A best-performing DNN from amongst the several DNNs is then identified, and the radar system is configured with a pre-processing algorithm that is parameterized by parameter values that correspond to the best-performing DNN.

The above-described approach for selecting parameter values to use when generating three-dimensional point clouds is both computationally expensive and time-consuming. Specifically, large volumes of training data must be generated for each potential set of parameters. In addition, a separate DNN is trained for each set of training data. Accordingly, it may take several months as well as a significant amount of computing resources to identify suitable parameter values for use in connection with generating point clouds.

SUMMARY

The following is a brief summary of subject matter that is described in greater detail herein. This summary is not intended to be limiting as to scope of the claims.

In view of the foregoing, there is need for technologies that are well-suited for identifying parameter values for use in connection with point clouds based upon raw radar data generated by a radar system. Various technologies relating to computing parameter values for use in connection with generating point clouds based upon raw radar data generated by a radar system are described herein, where a system includes the radar system.

There are various advantages to the technologies described herein over conventional computing technologies that are configured to learn parameter values for algorithms that are employed to generate n-dimensional point clouds. The technologies described herein result in a reduction in an amount of time required to identify suitable parameter values used in radar point cloud generation when compared to conventional technologies, and further result in improved performance of a DNN that is trained to identify objects based upon received point clouds when compared to conventional technologies. More specifically, computer code that is configured to generate point clouds is converted to be in auto-differentiated form, such that the converted code is suitable for inclusion as a layer in a neural network. This auto-differentiated code is then prepended to a DNN that is to be trained to identify objects in an environment of the radar system, thereby forming a "combined" DNN, where the auto-differentiated code is an input layer of the combined DNN.

The combined DNN is then trained based upon raw radar data (where the raw radar data was generated by a radar system coupled to a vehicle). The raw radar data is labeled to identity objects represented by the raw radar data. During training, the aforementioned parameter values of the pre-processing algorithm (the algorithm that generates point clouds based upon raw radar data) and weight matrices of the DNN are to be learned. Hence, to train the combined DNN, batches of raw radar data are provided as input to the combined DNN, and backpropagation and gradient descent are employed to modify the parameter values and weights of the weight matrices until a threshold number of training iterations are undertaken, until a loss function is approximately minimized, or some other suitable metric is met.

Upon training of the combined DNN being completed, the pre-processing algorithm and the DNN are deployed in system, where the pre-processing algorithm is deployed in a radar system of the system and the DNN is deployed in a centralized processing system of the system, and further where the pre-processing algorithm is parameterized with the learned parameter values and the DNN is parameterized with the learned weight matrices. Therefore, during operation of the system, the radar system generates raw radar data and, through use of the parameterized pre-processing algorithm, generates point clouds. The radar system transmits the point clouds to the central processing system, where the point clouds are provided to the DNN (parameterized with the learned weight matrices) as input. The DNN generates outputs based upon the received point clouds, where the outputs are indicative of identities of objects represented in the raw radar data.

As noted previously, there are several advantages associated with the computing technologies referenced above. With respect to the pre-processing algorithm, the technologies described herein identify suitable parameter values for such algorithm more quickly, and with fewer computational resources, when compared to conventional approaches. In addition, when deployed in a system (such as an AV, an aircraft, or other suitable use case), the technologies described herein provide for improved performance of a DNN when compared to conventional approaches, as learning of weight matrices of the DNN occur concurrently with learning of the parameter values of the pre-processing algorithm, and thus co-dependencies between the parameter values and weight matrices are accounted for in the trained DNN.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
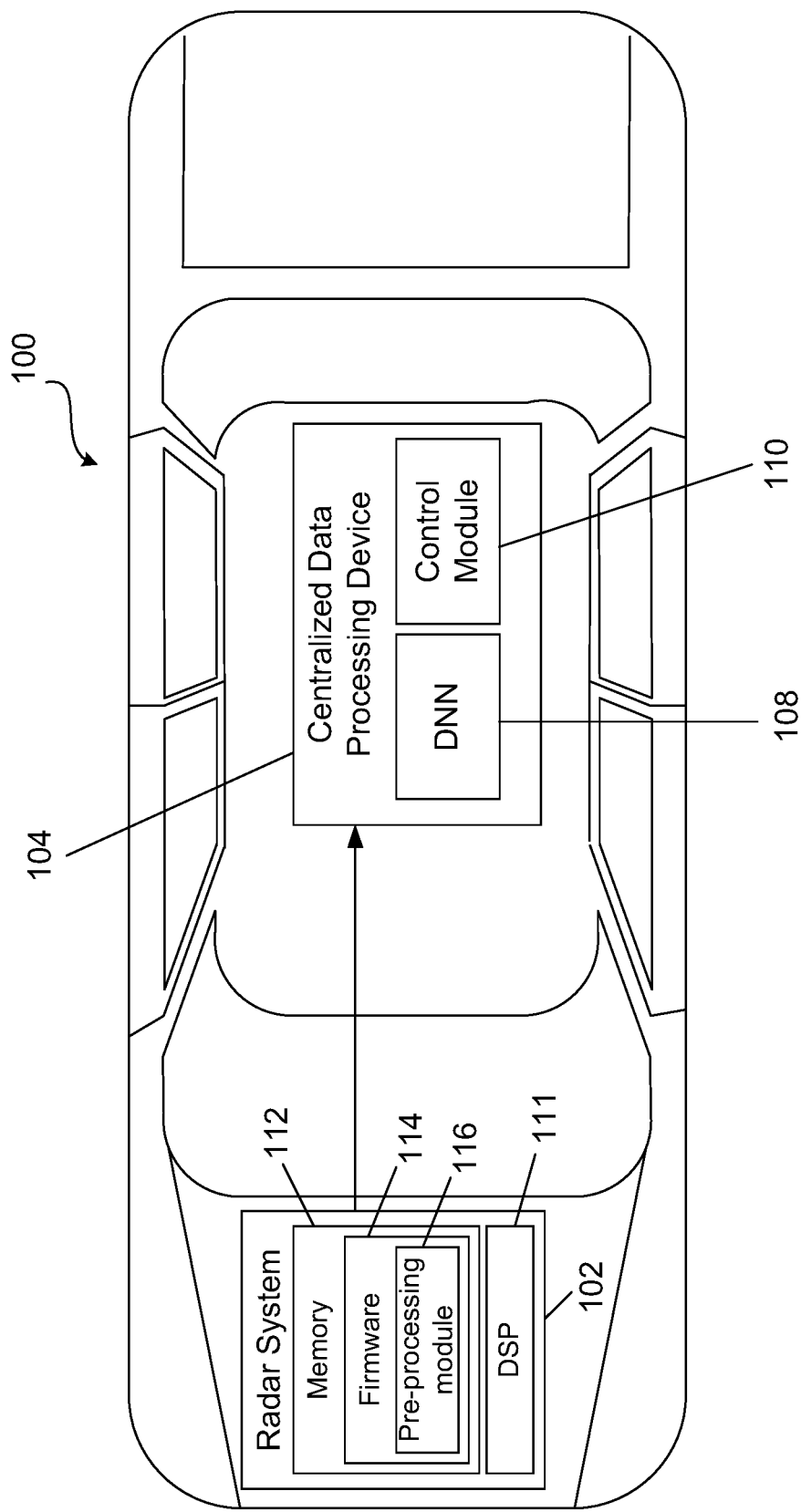
FIG. 1 is a schematic that illustrates an autonomous vehicle (AV) that includes a radar system and a central data processing device, where the radar system is configured to output point clouds based upon raw radar data generated by the radar system.

Various technologies pertaining to identifying parameter values for a pre-processing algorithm included in a radar system are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein are various technologies relating to identifying parameter values for a pre-processing algorithm, where the pre-processing algorithm is configured to generate n-dimensional point clouds based upon raw radar data generated by a radar system. The point clouds are subsequently processed by a deep neural network (DNN) that is configured to identify and label objects represented in the raw radar data. As will be described in greater detail herein, the parameter values for the pre-processing algorithm are learned jointly with weight matrices of the DNN being learned, such that both the parameter values of the pre-processing algorithm and the weight matrices of the DNN are (based upon a set of training data) optimized for an object identification task. During operation of a system that includes the radar system (and subsequent to the parameter values and the weight matrices being learned), a processing device of the radar system executes the pre-processing algorithm (with the values of the parameters being set in firmware) to generate point clouds, and a centralized data processing device (such as a GPU or several GPUs) executes the DNN, where the DNN receives the point clouds and identifies objects represented in the radar data. The centralized data processing device can then perform an action based upon the identified object, where the action performed can depend upon a type of system that includes the radar system.

The technologies described herein have various advantages over conventional technologies associated with identifying values of parameters of pre-processing algorithms that are used to generate point clouds based upon raw radar data, in that the values of the parameters of the pre-processing algorithm that generates the point clouds are learned simultaneously with weight matrices of the DNN, such that during operation of a system that includes the DNN, the DNN has improved accuracy when labeling objects compared to conventionally-trained DNNs.

Examples set forth herein pertain to an autonomous vehicle (AV) including a radar system that generates point clouds based upon parameter values that are learned jointly with weight matrices of a DNN. It is to be understood, however, that point clouds generated by the radar system described herein can be employed in a variety of different scenarios, such as flight, in drone technologies, in monitoring technologies (e.g., security technologies), and so forth. AVs are set forth herein as one possible use case, and features of the claims are not to be limited to AVs unless such claims explicitly recite an AV.

Referring now to FIG. 1, an AV 100 is illustrated. The AV 100 can be a level 5 fully autonomous AV. While illustrated as an automobile, it is to be understood that the AV 100 may be a truck, a motorcycle, a ground-based drone, or other suitable AV. The exemplary AV 100 includes a radar system 102. While not illustrated, it is to be understood that the AV 100 can also include other sensor systems such as a camera, a lidar sensor system, an ultra-sonic sensor system, an infrared sensor system, a global positioning system (GPS), an accelerometer, and/or other suitable sensor systems. The AV 100 further includes a centralized data processing device 104, where the radar system 102 is configured to transmit data to the centralized data processing device 104. As will be described in greater detail herein, the radar system 102 is configured to transmit n-dimensional point clouds to the centralized data processing device 104 based upon radar signals detected by the radar system 102, where n can be 2, 3, 4, 5, or more. In an example, the radar system 102 can be a multiple input multiple output (MIMO) radar system.

The radar system 102 includes conventional radar circuitry, where such circuitry comprises a receive (Rx) chain and a transmit (Tx) chain. The Rx chain includes at least one Rx antenna, an amplifier, an analog to digital converter (ADC), and a digital signal processor (DSP) 111. The Tx chain includes the DSP 111, a digital to analog converter (DAC), an amplifier, and at least one Tx antenna. In operation, the Tx antenna emits radar signals based upon a digital signal generated by the DSP 111, and the radar signals reflect from objects in an environment of the AV 100. The Rx antenna detects reflected radar signals, the ADC converts the detected radar signals into digital signals, and the DSP 111 generates point clouds based upon the digital signals. With more particularity, the DSP 111 constructs multi-dimensional data based upon the detected radar signals, wherein such multi-dimensional data includes range, velocity, and directional data. Specifically, the radar system 102 generates raw radar data in the form of data tensors that have bins in multiple dimensions, where, for one type of data tensor, the bins include range, Doppler (velocity), and azimuth (beam), and further where the data tensor can include real and complex values for phase information generated by the radar system. The DSP 111 converts the data in the bins to points in n-dimensional space to construct an n-dimensional point cloud. While the radar system 102 has been described as detecting reflected radar signals that have been emitted by the radar system 102, it is to be understood that the radar system 102 may be passive, in that the radar system 102 can detect radar signals that have not been emitted by the radar system 102.

In an exemplary embodiment, the radar system 102 may be an FMCW radar system, where a radar signal with a linearly modulated frequency is emitted and the echo signal that is reflected from objects in a scene is recorded. In operation, the received echo signal is mixed with the transmitted radar signal to obtain a frequency difference between the emitted radar signal and the echo signal, where the difference is referred to as a beat frequency. This beat frequency is indicative of the range of an object in the environment of the AV 100 (e.g., the distance between the radar system 102 and the object). The radar system 102 can include multiple receiver channels to infer azimuth angles of objects through digital beamforming. The radar signal pulse emitted by the transmitting antenna is repeated multiple times, and from the phase shift between adjacent pulses (caused by radial motion occurring between pulses within a range resolution cell), the Doppler radial velocity in the cell can be computed. Thus, the radar system 102 can generate the data tensor, where the data tensor can be one or more of the following types: 1) a first type of data tensor that includes bins for samples, ramps, and channels (time domain data); 2) a second type of data tensor that includes bins for range, ramps, and channels (range data); a third type of data tensor that includes bins for range, doppler, and channels (velocity data); or 4) a fourth type of data tensor that includes bins for range, doppler, and azimuth (beam data). The data tensor(s) are subsequently employed to detect objects in the environment of the AV 100 as the AV 100 autonomously travels a region.

Due to the digital beamforming, the radar system 102 measures data in polar coordinates, with a specific resolution in range and azimuth. Thus, a signal (that corresponds to an object) that covers multiple bins in azimuth varies with range, because an object covers more and more azimuth bins the closer the object is to the radar system 102.

The radar system 102 further includes memory 112, where the memory 112 includes firmware 114, and further where the firmware 114 includes a pre-processing module 116. The pre-processing module 116 is executed by the DSP 111, where the pre-processing module 116 includes a computer-executable algorithm that is parameterized by parameter values (for a predefined set of parameters), where the pre-processing module 116 receives raw radar data generated by the radar system 102, and further where the pre-processing module 116 generates point clouds based upon the parameter values and the raw radar data. Accordingly, a change in one or more parameter values of the pre-processing module 116 results in a change in a point cloud generated by way of the pre-processing module 116. The parameters may correspond to different parameters of a point cloud; for instance, a high value for a first parameter may result in angular resolution in the raw radar data being mostly preserved in the point cloud (while sacrificing range resolution). Contrarily, a high value for a second parameter may result relatively high range resolution in one area with lower range resolution in another area. One skilled in the art will recognize that the pre-processing module 116 has several settable parameters, where values of such parameters influence point clouds output by the pre-processing module 116.

In an example, the pre-processing module 116 can include a constant false alarm rate (CFAR) algorithm, where the CFAR algorithm is parameterized by several parameters. Such parameters include false alarm probability threshold, guard band size, training band size, amongst several other parameters. In CFAR algorithms, generally, a detection threshold is varied as a function of a sensed environment, where the CFAR algorithm estimates an amount of interference (noise or clutter) in radar range cells on either side of a range cell and uses such estimate to determine if there is a target in the cells of interest in the center.

The centralized data processing device 104 is configured to execute a number of software routines, where the routines include a DNN 108 that is configured to receive point clouds output by the radar system 102 and assign labels to objects represented in the point clouds (where a label may be, for example, "pedestrian", "vehicle", "bicyclist", "fire hydrant", etc.). The DNN 108 includes weight matrices, where nodes in the DNN 108 have respective weight matrices assigned thereto, and further where the weight matrices are learned during training of the DNN 108. Further, the centralized data processing device 104 includes a control module 110 that, based on outputs of the DNN 108, control a propulsion system, a braking system, and/or a steering system of the AV 100 to control movement of the AV 100.

While the radar system 102 is shown as being located at the front of the AV 100, with the centralized data processing device 104 being near a center of the AV 100, it is to be understood that the radar system 102 and the centralized data processing device 104 may be positioned at any suitable location within or upon the AV 100.

The radar system 102 may be any suitable type of radar system, such as a continuous wave (CW) radar system (including a frequency modulated continuous wave (FMCW) radar system or an unmodulated CW radar system) or a pulsed radar system. The centralized data processing device 104 can be or include a central processing unit (CPU), a graphical processing unit (GPU), a field programmable gate array (FPGA), or any suitable combination of such computing devices. Further, the DNN 108 may be or include any suitable type of DNN, including a convolutional neural network, a recurrent neural network, a graph neural network, etc.

As mentioned above, conventionally, the parameter values of the pre-processing module 116 are selected entirely separately from the weight matrices of the DNN 108 being learned. For example, an expert can set the parameter values of the pre-processing module 116, and a radar system can generate point clouds based upon the parameters; these point clouds are subsequently used to train the DNN 108, and thus are used to learn the weight matrices of the DNN 108. This conventional approach, however, is suboptimal, as the weight matrices of the DNN 108 may be learned based upon suboptimal point clouds.

In contrast, in accordance with the technologies described herein, the parameter values of the pre-processing module 116 and weight matrices of the DNN 108 can be jointly learned, such that co-dependencies between parameter values and weight matrices, with respect to accurately identifying objects in an environment, can be taken into account. The result is that the DNN 108 has improved performance relative to a DNN that has been trained using conventional approaches.

Figure 2:
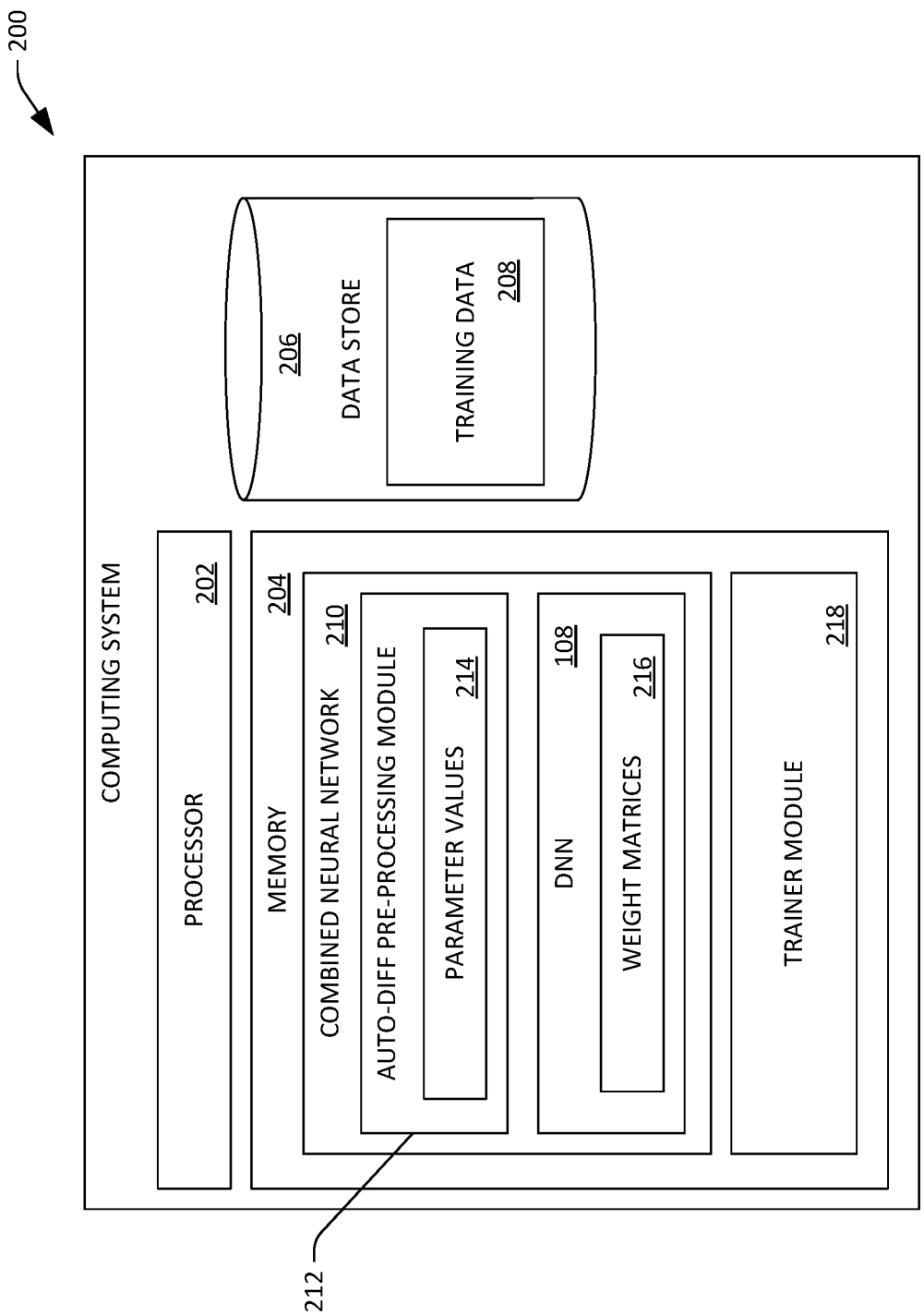
FIG. 2 is a functional block diagram of a computing system that is configured to jointly learn parameters of a preprocessing algorithm and weight matrices of a DNN.

Referring now to FIG. 2, a functional block diagram of an exemplary computing system 200 that is configured to jointly learn parameter values for the preprocessing module 116 and weight matrices of the DNN 108 is illustrated. The computing system 200, in an example, may be a cluster of server computing devices. The computing system 200 includes a processor 202 and memory 204, where the memory 204 includes instructions that are executed by the processor 202. The computing system 200 also includes a data store 206, where the data store can be any suitable type of computer-readable data storage, and further where the data store 206 includes training data 208. The training data 208 includes raw radar data, where the raw radar data may be generated by radar systems coupled to vehicles that navigate about geographic regions.

The memory 204 includes a combined neural network 210, where the combined neural network 210 includes the preprocessing module 116 in auto-differentiated form (an auto-diff preprocessing module 212). The combined neural network 210 also includes the DNN 108 that is to be trained. Placing the preprocessing module 116 in auto-differentiated form allows for the auto-diff preprocessing module 212 to be included in a neural network (i.e., the combined neural network 210). Hence, the auto-diff preprocessing module 212 acts as an input layer of the combined neural network 210, where the auto-diff preprocessing module 212 includes parameter values 214 that are to be learned during training of the combined neural network 210. Put differently, the parameter values 214 are identified as variables whose values can be altered in connection with minimizing output of a loss function.

The DNN 108 includes weight matrices 216 whose values are to be learned during training of the combined neural network 210. Values in the weight matrices 216 impact features extracted from the raw sensor data that is provided as input to the combined neural network 210.

The memory 204 additionally includes a trainer module 218 that is configured to train the combined neural network 210 based upon the training data 208 in the data store 206. The training data 208, as indicated above, includes raw radar data and labels assigned to such raw radar data, where the labels indicate that certain objects are represented in the raw radar data. For example, an instance of raw radar data in the training data 208 can include a label that indicates that a vehicle is represented in the raw radar data. By combining the DNN 108 with the auto-diff preprocessing module 212, training of the combined neural network 210 by the trainer module 218 results in the joint learning of the parameter values 214 of the auto-diff preprocessing module 212 and the weight matrices 216 of the DNN 108. The trainer module 218 can utilize any suitable approach for training the combined neural network 210, including backpropagation and (stochastic) gradient descent.

This joint learning of the parameter values 214 and the weight matrices 216 results in improved performance of the DNN 108 relative to DNNs trained by way of conventional approaches. The improvement is due to co-dependencies between the parameter values 214 and the weight matrices 216 being taken into account during training of the combined neural network 210. In contrast, in conventional approaches, the DNN 108 is trained based upon training data that is dependent upon pre-selected parameter values of the preprocessing module 116. Accordingly, when the parameter values are sub-optimally selected, the resultant DNN will perform sub-optimally.

Upon the trainer module 218 training the combined neural network 210, the learned parameter values 214 are stored and then placed in firmware of a radar system. Accordingly, the radar system 102 (FIG. 1) includes the preprocessing module 116 with the learned parameter values 214, such that the preprocessing module 116 generates point clouds based upon the learned parameter values 214. Further, the DNN 108 (with the learned weight matrices 216) is installed on the central data processing device 104; accordingly, the DNN 108 generates output based upon: 1) point clouds generated by the pre-processing module 116; and 2) the learned weight matrices 216.

Figure 3:
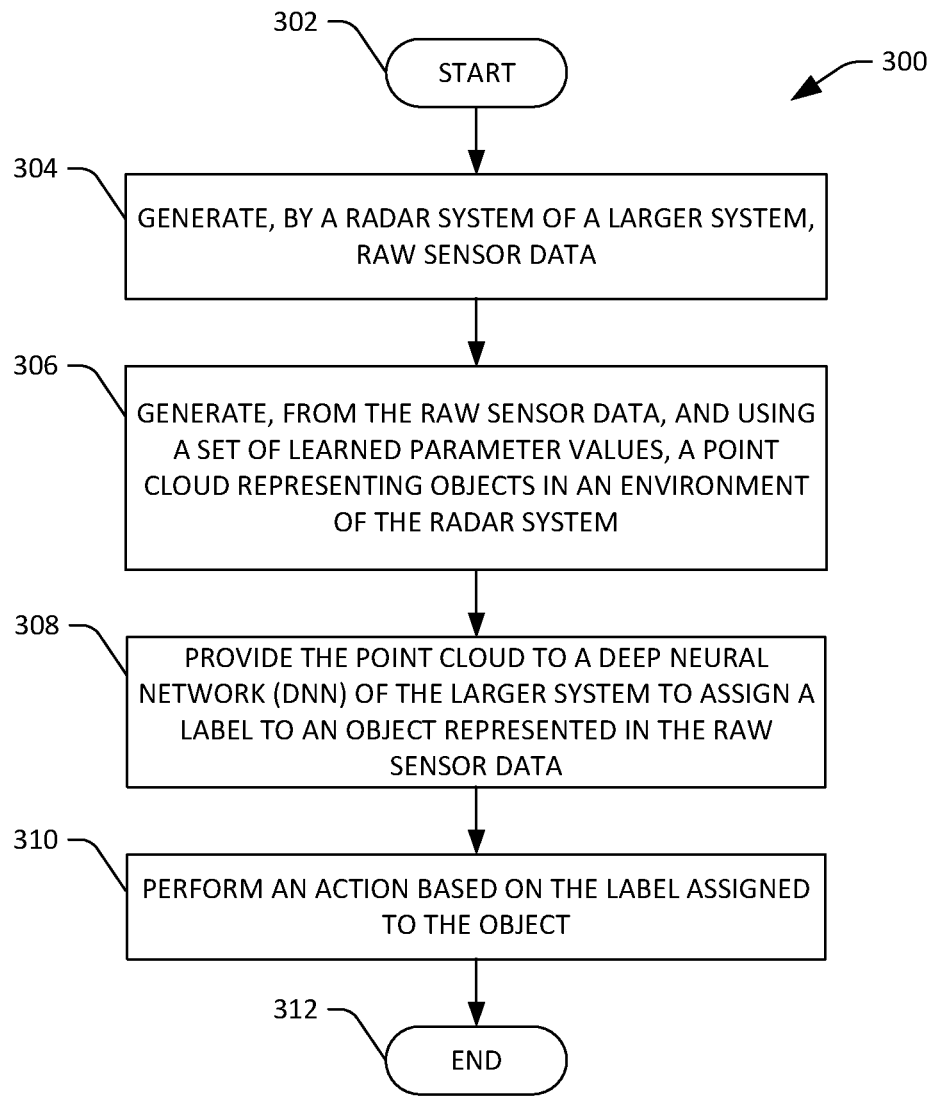
FIG. 3 is a flow diagram illustrating an exemplary methodology for performing a driving maneuver based upon a label assigned to an object represented in raw radar data generated by a radar system.
Figure 4:
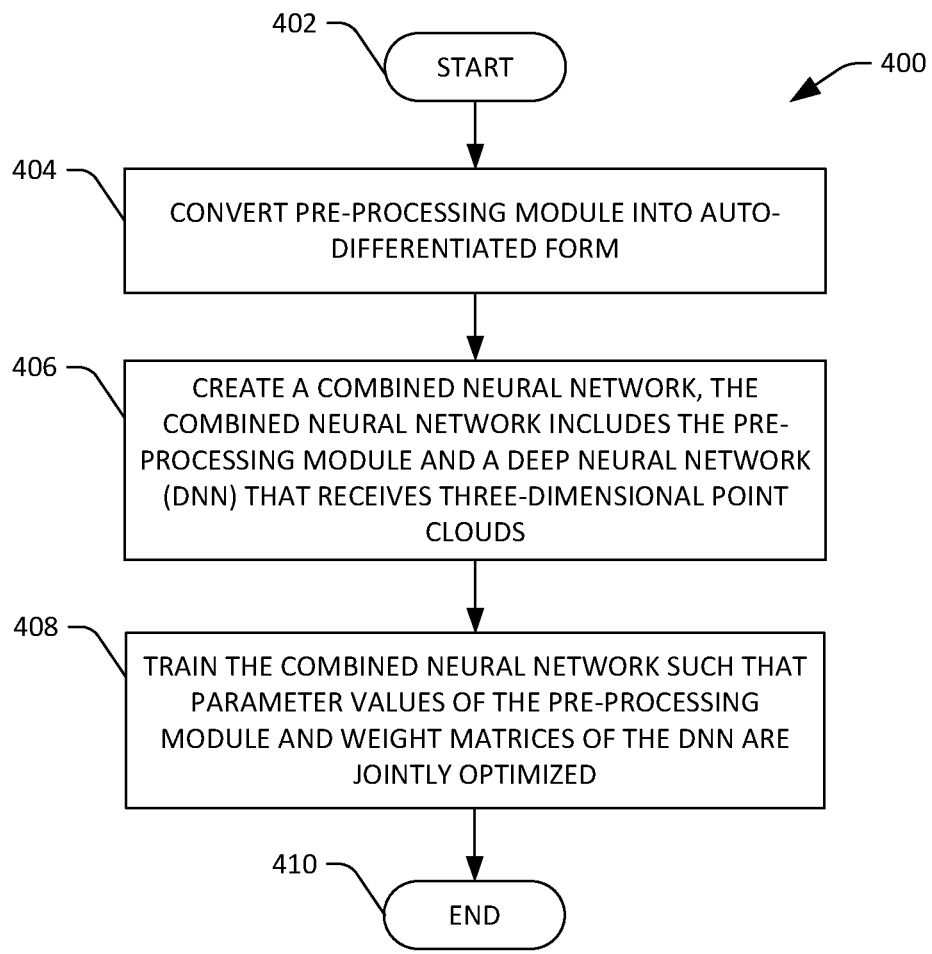
FIG. 4 is a flow diagram illustrating an exemplary methodology for jointly learning parameter values of a preprocessing algorithm and weight matrices of a DNN.

FIGS. 3 and 4 illustrate methodologies relating to learning parameter values for use when generating point clouds based upon raw radar data. While the methodologies are shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

With reference solely to FIG. 3, a flow diagram illustrating a methodology 300 performed by a system in connection with identifying an object in an environment of a radar system. The methodology 300 starts at 302, and at 304 a radar system of the system generates raw sensor data. As described above, the raw sensor data may be in the form of a data tensor.

At 306, a set of learned parameter values is used to generate a point cloud based upon the raw sensor data. The point cloud represents objects in the environment around the system, for example, vehicles, pedestrians, or obstacles on the road, in the air, on the water, etc. Moreover, as described above, the parameter values are jointly learned with weight matrices of a DNN that is to receive the point cloud.

At 308, the point cloud is provided to the DNN, which identifies an object based upon the point cloud and the learned weight matrices. For instance, the DNN assigns a label to the point cloud, where the label is indicative of an identity of the object represented in the raw sensor data. At 310, an action is performed based upon the label assigned to the object. The methodology 300 completes at 310.

Now turning to FIG. 4, a methodology 400 for learning parameter values of a preprocessing module of a radar system is illustrated, where the preprocessing module is configured to generate point clouds based upon raw radar data. The methodology 400 starts at 402, and at 404 the preprocessing module is converted into auto-differentiated form. Hence, the auto-differentiated preprocessing module can be a layer in a neural network.

At 406, a combined neural network is created, where the combined neural network includes the pre-processing module (in auto-differentiated form) and a DNN. The DNN is to be trained to identify and assign labels to objects based upon point clouds.

At 408, the combined neural network is trained such that parameter values of the auto-differentiated preprocessing module and weight matrices of the DNN are jointly optimized (e.g., optimizing performance of the combined DNN results in optimization of both the parameter values and the weight matrices). Subsequently, the preprocessing module is parameterized with the learned parameter values, and is included in a radar system of a larger system (such that the preprocessing module receives raw radar data as input and generates point clouds as output). In addition, the DNN (with the learned weight matrices) is instantiated on a central data processing device of the larger system, and receives point clouds output by the preprocessing module. The central data processing device identifies and assigns labels to objects represented in the point clouds, and an action is undertaken based upon the labels assigned to the objects. The methodology 400 completes at 412.

Figure 5:
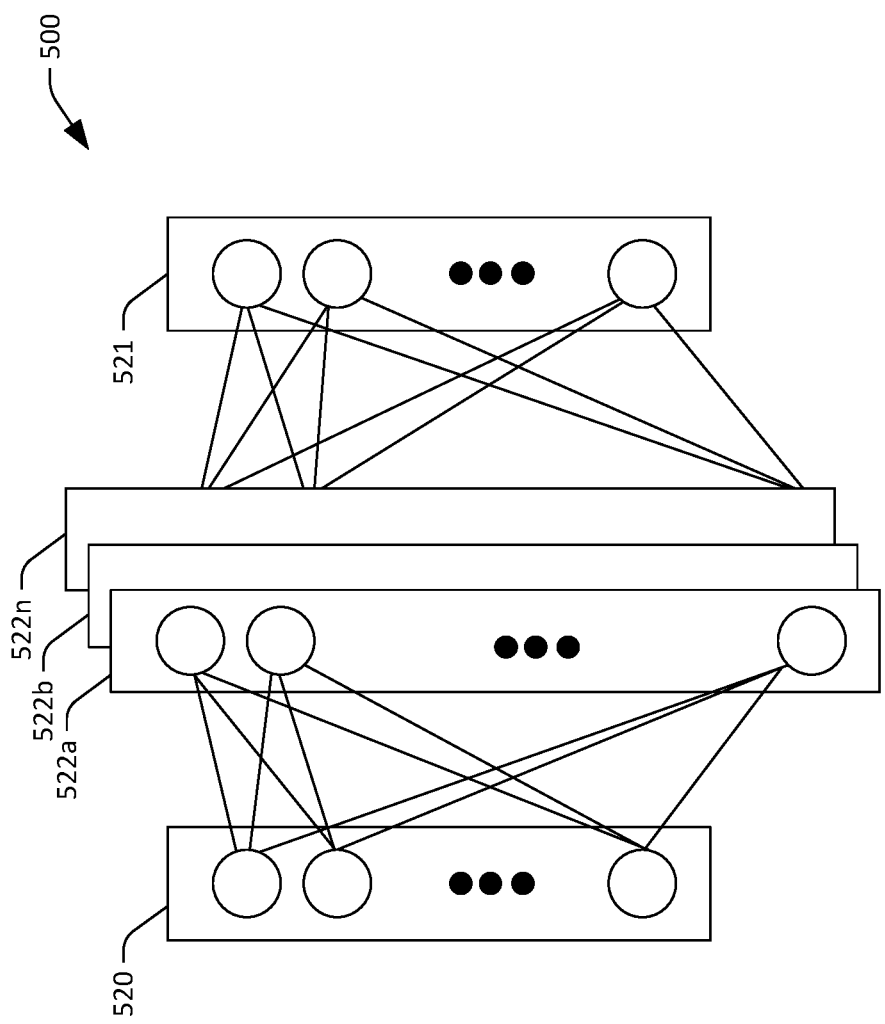
FIG. 5 illustrates an exemplary neural network.

FIG. 5 is set forth in connection with presenting a further discussion of models that can be used through the environments and techniques described herein. Specifically, FIG. 5 is an illustrative example of a deep learning neural network 500 that can be used to implement all or a portion of the DNN 108 and/or the combined neural network 210, as discussed above. An input layer 520 can be configured to receive sensor data and/or data relating to an environment surrounding a radar system. For instance, the input layer 520 can be configured to receive point clouds. The neural network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. The neural network 500 further includes an output layer 521 that provides an output resulting from the processing performed by the hidden layers 522a, 522b, through 522n. In one illustrative example, the output layer 521 can provide labels that identify objects in the environment surrounding the radar system.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the first hidden layer 522a can transform the information of each input node by applying activation functions to the input node information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 521, at which an output is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is trained to process the features from the data in the input layer 520 using the different hidden layers 522a, 522b, through 522n in order to provide the output through the output layer 521.

In some cases, the weights of the nodes of the neural network 500 can be updated using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. A backward pass can be performed (e.g., by the training module 218) by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
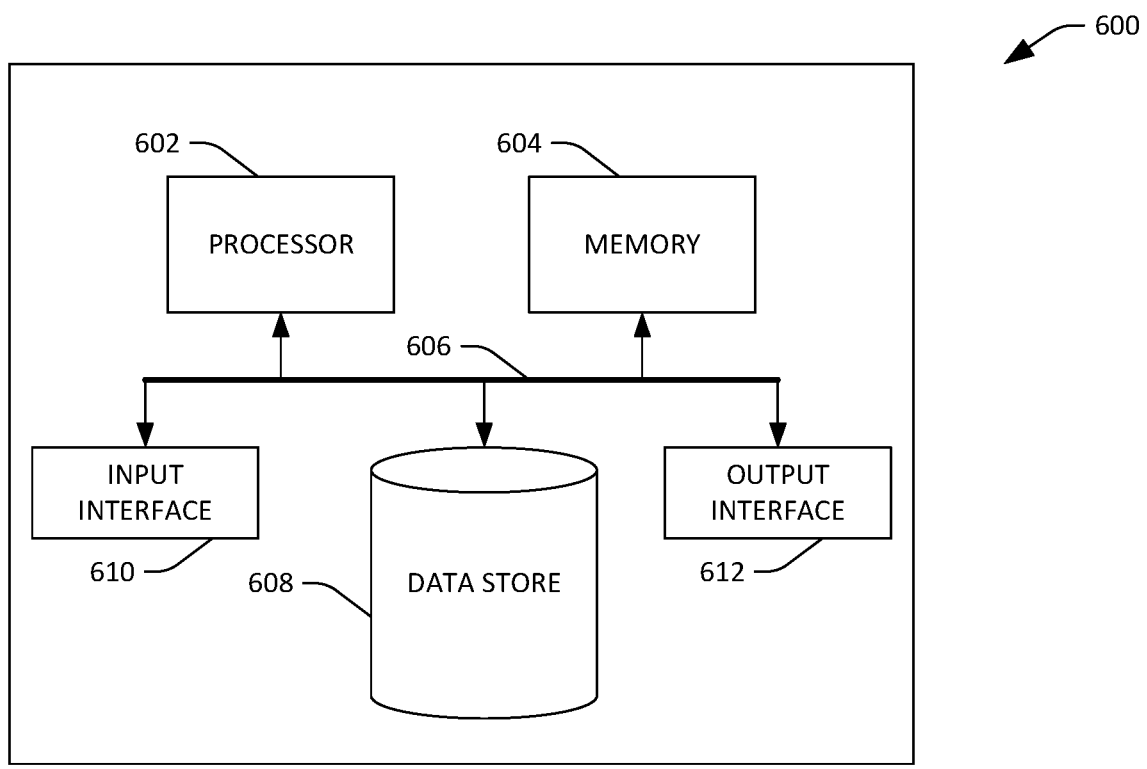
FIG. 6 is an exemplary computing system.

Referring now to FIG. 6, a high-level illustration of a computing device 600 that can be used in accordance with the systems and methodologies disclosed herein is illustrated. For instance, the computing device 600 may be used in a system that is configured to learn parameters of a preprocessing module that is configured to generate point clouds based upon raw radar data. In another example, the computing device 600 may be used in a system that is configured to learn weight matrices of a DNN. In yet another example, the computing device 600 may be used in an AV, where the computing device 600 is configured to control operation of the AV. The computing device 600 includes at least one processor 602 that executes instructions that are stored in a memory 604. The processor 602 may be a central processing unit (CPU), a graphical processing unit (GPU), a field programmable gate array (FPGA), or any suitable combination of such computing devices. The instructions may be, for instance, instructions for implementing functionality described as being carried out by one or more modules discussed above or instructions for implementing one or more of the methods described above. The processor 602 may access the memory 604 by way of a system bus 606. In addition to storing executable instructions, the memory 604 may also store sensor data, data tensors, extracted feature values, images, positional encodings, etc.

The computing device 600 additionally includes a data store 608 that is accessible by the processor 602 by way of the system bus 606. The data store 608 may include executable instructions, raw radar data, data tensors, extracted feature values, three-dimensional point clouds, etc.

The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

Described herein are systems and methods according to at least the following examples.

(A1) In an aspect, a radar system includes a transmitting antenna that transmits radar signals into an environment of the radar system and a receiving antenna that detects the radar signals subsequent to the radar signals reflecting off of objects in the environment of the radar system. The radar system further includes a data processing device that is in communication with the receiving antenna, where the processing device is programmed to perform several acts. The acts include generating raw radar data based upon the radar signals detected by the antenna. The acts also include generating n-dimensional point clouds based upon the raw radar data and parameter values of a preprocessing algorithm, where the preprocessing algorithm is parameterized with the parameter values, where the preprocessing algorithm receives the raw radar data and outputs the n-dimensional point clouds based upon the parameter values, and further where the parameter values are jointly learned with weight matrices of a deep neural network (DNN). The DNN is configured to receive the n-dimensional point clouds generated by the radar system as input and identify an object in the environment of the radar system based upon the n-dimensional point clouds.

(A2) In some embodiments of the radar system of (A1), the raw radar data is in the form of a data tensor.

(A3) In some embodiments of the radar system of at least one of (A1)-(A2), at least one parameter in the parameters corresponds to range resolution in the n-dimensional point cloud.

(A4) In some embodiments of the radar system of at least one of (A1)-(A3), at least one parameter in the parameters corresponds to directional resolution in the n-dimensional point cloud.

(A5) In some embodiments of the radar system of at least one of (A1)-(A4), the radar system is a multi-input multi-output (MIMO) radar system.

(A6) In some embodiments of the radar system of at least one of (A1)-(A5), the radar system additionally includes memory that is operably coupled to the data processing device, where firmware stored in the memory includes the preprocessing algorithm.

(A7) In some embodiments of the radar system of at least one of (A1)-(A6), the data processing device is a digital signal processor (DSP).

(A8) In some embodiments of the radar system of at least one of (A1)-(A7), the radar system is configured for inclusion in an autonomous vehicle (AV).

(B1) In another aspect, a method performed by a radar system is described, where the method includes transmitting, by a transmitting antenna, radar signals into an environment of the radar system and detecting, by a receiving antenna, reflections of the radar signals, wherein the radar signals have reflected from objects in the environment of the radar system. The method also includes generating, by a processing device, raw radar data based upon the reflections of the radar signals detected by the receiving antenna. The method further includes generating, by the processing device, n-dimensional point clouds based upon the raw radar data and parameter values of a preprocessing algorithm, where the preprocessing algorithm is parameterized with the parameter values, where the preprocessing algorithm is configured to receive the raw radar data as input and is configured to output the n-dimensional point clouds based upon the parameter values, and further where the parameter values are jointly learned with weight matrices of a deep neural network (DNN). The DNN is configured to receive the n-dimensional point clouds generated by the processing device as input and identify an object in the environment of the radar system based upon the n-dimensional point clouds.

(B2) In some embodiments of the method of (B1), the raw radar data is in the form of a data tensor.

(B3) In some embodiments of the method of at least one of (B1)-(B2), at least one parameter in the parameters corresponds to range resolution in the n-dimensional point cloud.

(B4) In some embodiments of the method of at least one of (B1)-(B3), at least one parameter in the parameters corresponds to directional resolution in the n-dimensional point cloud.

(B5) In some embodiments of the method of at least one of (B1)-(B4), the radar system is a multi-input multi-output (MIMO) radar system.

(B6) In some embodiments of the method of at least one of (B1)-(B5), firmware stored in memory of the radar system includes the preprocessing algorithm.

(B7) In some embodiments of the method of at least one of (B1)-(B6), the processing device is a digital signal processor (DSP).

(B8) In some embodiments of the method of at least one of (B1)-(B7), the radar system is configured for inclusion in an autonomous vehicle (AV).

(C1) In another aspect, a computing system that is configured to learn parameter values of a preprocessing algorithm is described herein, where the preprocessing algorithm is configured to generate n-dimensional point clouds based upon raw radar data and the parameter values. The computing system includes a processor and memory storing instructions that, when executed by the processor, cause the processor to perform several acts. The acts include training a combined neural network based upon training data. The trained neural network includes a first layer, where the first layer is the preprocessing algorithm in auto-differentiated form. The combined neural network also includes a deep neural network (DNN) that, when trained, is configured to identify objects in an environment of a radar system, and further where the training data comprises labeled raw radar data, wherein the labeled raw radar data has labels assigned thereto that identify objects represented in the labeled raw radar data, and further where the first layer has a set of parameter values assigned thereto upon the training of the combined neural network being completed. The acts also include assigning the set of parameters to the preprocessing algorithm, wherein the preprocessing algorithm is configured for execution by a processing device of a radar system to generate n-dimensional point clouds based upon raw radar data generated by the radar system and the set of parameter values assigned to the preprocessing algorithm.

(C2) In some embodiments of the computing system of (C1), training the combined neural network results in learning weight matrices of the DNN, wherein the weight matrices of the DNN are learned jointly with the set of parameter values of the preprocessing algorithm in auto-differentiated form.

(C3) In some embodiments of the computing system of (C2), the DNN, when trained, is configured to assign labels to objects represented in the raw radar data generated by the radar system based upon the n-dimensional point clouds output by the preprocessing algorithm and further based upon the learned weight matrices.

(C4) In some embodiments of the computing system of at least one of (C1)-(C3), the acts further include transforming the preprocessing algorithm into the auto-differentiated form.

(D1) In yet another aspect, an autonomous vehicle includes at least one of the radar systems described herein (e.g., at least one of the radar systems of (A1)-(A8)).

(E1) In still yet another aspect, an autonomous vehicle includes the radar system that performs at least one of the methods described herein (e.g., at least one of the methods of (B1)-(B8)).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A radar system comprising:
a transmitting antenna that transmits radar signals into an environment of the radar system;
a receiving antenna that detects the radar signals subsequent to the radar signals reflecting off of objects in the environment of the radar system;
a data processing device that is in communication with the transmitting antenna and the receiving antenna, wherein the data processing device is programmed to perform acts comprising:
generating raw radar data based upon the radar signals detected by the receiving antenna; and
generating n-dimensional point clouds based upon the raw radar data and parameter values of an auto-differentiated preprocessing algorithm corresponding to an input layer of a combined neural network, wherein the auto-differentiated preprocessing algorithm is prepended to a deep neural network (DNN) of the combined neural network, wherein the auto-differentiated preprocessing algorithm is parameterized with the parameter values, wherein the auto-differentiated preprocessing algorithm receives the raw radar data and outputs the n-dimensional point clouds based upon the parameter values, and further wherein the combined neural network is trained by jointly optimizing both the parameter values of the auto-differentiated preprocessing algorithm and weight matrices of the DNN that is configured to:
receive the n-dimensional point clouds generated by the radar system as input; and
identify an object in the environment of the radar system based upon the n-dimensional point clouds.

2. The radar system of claim 1, wherein the raw radar data is in a form of a data tensor.

3. The radar system of claim 1, wherein at least one parameter value in the parameter values corresponds to range resolution in the n-dimensional point cloud.

4. The radar system of claim 1, wherein at least one parameter value in the parameter values corresponds to directional resolution in the n-dimensional point cloud.

5. The radar system of claim 1 being a multi-input multi-output (MIMO) radar system.

6. The radar system of claim 1, further comprising memory that is operably coupled to the data processing device, wherein firmware stored in the memory includes the auto-differentiated preprocessing algorithm.

7. The radar system of claim 1, wherein the data processing device is a digital signal processor (DSP).

8. The radar system of claim 1, wherein the radar system is configured for inclusion in an autonomous vehicle (AV).

9. A method performed by a radar system, the method comprising:
transmitting, by a transmitting antenna, radar signals into an environment of the radar system;
detecting, by a receiving antenna, reflections of the radar signals, wherein the radar signals have reflected from objects in the environment of the radar system;
generating, by a processing device, raw radar data based upon the reflections of the radar signals detected by the receiving antenna;
generating, by the processing device, n-dimensional point clouds based upon the raw radar data and parameter values of an auto-differentiated preprocessing algorithm corresponding to an input layer of a combined neural network, wherein the auto-differentiated preprocessing algorithm is prepended to a deep neural network (DNN) of the combined neural network, wherein the auto-differentiated preprocessing algorithm is parameterized with the parameter values, wherein the auto-differentiated preprocessing algorithm is configured to receive the raw radar data as input and is configured to output the n-dimensional point clouds based upon the parameter values, and further wherein the combined neural network is trained by jointly optimizing both the parameter values of the auto-differentiated preprocessing algorithm and weight matrices of the DNN that is configured to:

receive the n-dimensional point clouds generated by the processing device as input; and identify an object in the environment of the radar system based upon the n-dimensional point clouds.

10. The method of claim 9, wherein the raw radar data is in a form of a data tensor.

11. The method of claim 9, wherein at least one parameter value in the parameter values corresponds to range resolution in the n-dimensional point cloud.

12. The method of claim 9, wherein at least one parameter value in the parameter values corresponds to directional resolution in the n-dimensional point cloud.

13. The method of claim 9, wherein the radar system is a multi-input multi-output (MIMO) radar system.

14. The method of claim 9, wherein firmware stored in memory of the radar system includes the auto-differentiated preprocessing algorithm.

15. The method of claim 9, wherein the processing device is a digital signal processor (DSP).

16. The method of claim 9, wherein the radar system is configured for inclusion in an autonomous vehicle (AV).

17. A computing system that is configured to learn parameter values of an auto-differentiated preprocessing algorithm, wherein the auto-differentiated preprocessing algorithm is configured to generate n-dimensional point clouds based upon raw radar data and the parameter values, the computing system comprising:

a processor; and memory storing instructions that, when executed by the processor, cause the processor to perform acts comprising:

training a combined neural network based upon training data, the combined neural network comprises:

an input layer, wherein the input layer comprises the auto-differentiated preprocessing algorithm; and a deep neural network (DNN) that, when trained, is configured to identify objects in an environment of a radar system, and further wherein the training data comprises labeled raw radar data, wherein the labeled raw radar data has labels assigned thereto that identify objects represented in the labeled raw radar data, wherein the input layer is prepended to the DNN, wherein the input layer has the parameter values assigned thereto upon the training of the combined neural network being completed, and further wherein the combined neural network is trained by jointly optimizing both the parameter values of the auto-differentiated preprocessing algorithm and weight matrices of the DNN; and assigning the parameters values to the auto-differentiated preprocessing algorithm, wherein the auto-differentiated preprocessing algorithm is configured for execution by a processing device of a radar system to generate n-dimensional point clouds based upon raw radar data generated by the radar system and the parameter values assigned to the auto-differentiated preprocessing algorithm.

18. The computing system of claim 17, wherein training the combined neural network results in learning the weight matrices of the DNN.

19. The computing system of claim 18, wherein the DNN, when trained, is configured to assign labels to objects represented in the raw radar data generated by the radar system based upon the n-dimensional point clouds output by the auto-differentiated preprocessing algorithm and further based upon the learned weight matrices.

20. The computing system of claim 17, further comprising transforming a preprocessing algorithm into the auto-differentiated preprocessing algorithm.

* * * * *